United States Patent
Wu et al.

(10) Patent No.: US 7,760,089 B2
(45) Date of Patent: Jul. 20, 2010

(54) MICROWAVE DIRECTION OF TRAVEL DETECTOR BY PARALLEL SAMPLING

(75) Inventors: Xiaodong Wu, Roseville, CA (US); Leslie K. Green, Applegate, CA (US); James N. Helland, Agoura Hills, CA (US)

(73) Assignee: Honeywell International Inc., Morristown, NJ (US)

( * ) Notice: Subject to any disclaimer, the term of this patent is extended or adjusted under 35 U.S.C. 154(b) by 364 days.

(21) Appl. No.: 11/862,071

(22) Filed: Sep. 26, 2007

(65) Prior Publication Data
US 2009/0079564 A1 Mar. 26, 2009

(51) Int. Cl.
*G08B 13/18* (2006.01)

(52) U.S. Cl. ............... 340/554; 340/541; 340/545.3

(58) Field of Classification Search ............. 340/541, 340/554, 545.3
See application file for complete search history.

(56) References Cited

U.S. PATENT DOCUMENTS

| 4,543,577 A | 9/1985 | Tachibana et al. |
|---|---|---|
| 5,136,298 A | 8/1992 | Williams |
| 5,150,099 A * | 9/1992 | Lienau ............... 340/552 |
| 5,287,111 A | 2/1994 | Shpater |
| 6,380,882 B1 | 4/2002 | Hegnauer |
| 7,119,737 B2 | 10/2006 | Tsuji |
| 2007/0176765 A1 | 8/2007 | Babich et al. |

OTHER PUBLICATIONS

European Search Report, mailed Mar. 19, 2009 corresponding to European application No. 08165115.0-2220.
www.security.honeywell.com/hsce visited on May 15, 2007.
www.security.honeywell.com/hsce/products/sensor/mo/re/18987.html visited on May 15, 2007.
www.security.honeywell.com/hsce/products/sensor/mo/co/19018.html visited on May 15, 2007.
www.security.honeywell.com/hsce/products/sensor/mo/co/19008.html visited on May 15, 2007.

* cited by examiner

*Primary Examiner*—Travis R Hunnings
(74) *Attorney, Agent, or Firm*—Husch Blackwell Sanders Welsh & Katz

(57) ABSTRACT

A microwave direction of travel detector and method of detecting the direction of an intruder in a protected region. The microwave direction of travel detector transmits and receives, by a microwave transceiver a microwave signal directed toward a protected area. The microwave return signal is modulated by a moving target to produce a Doppler signal. The received Doppler signal is amplified by a chain of amplifiers having two or more amplifiers coupled to the microwave transceiver. A controller monitors the output of each chain of the amplifiers. The microwave sensor is configured for parallel sampling an amplified Doppler signal output from each amplifiers having a low signal output and each successive chain of the amplifiers a successively higher signal output. The controller determines if there is a direction of travel motion from the intruder and sends an alarm.

6 Claims, 1 Drawing Sheet

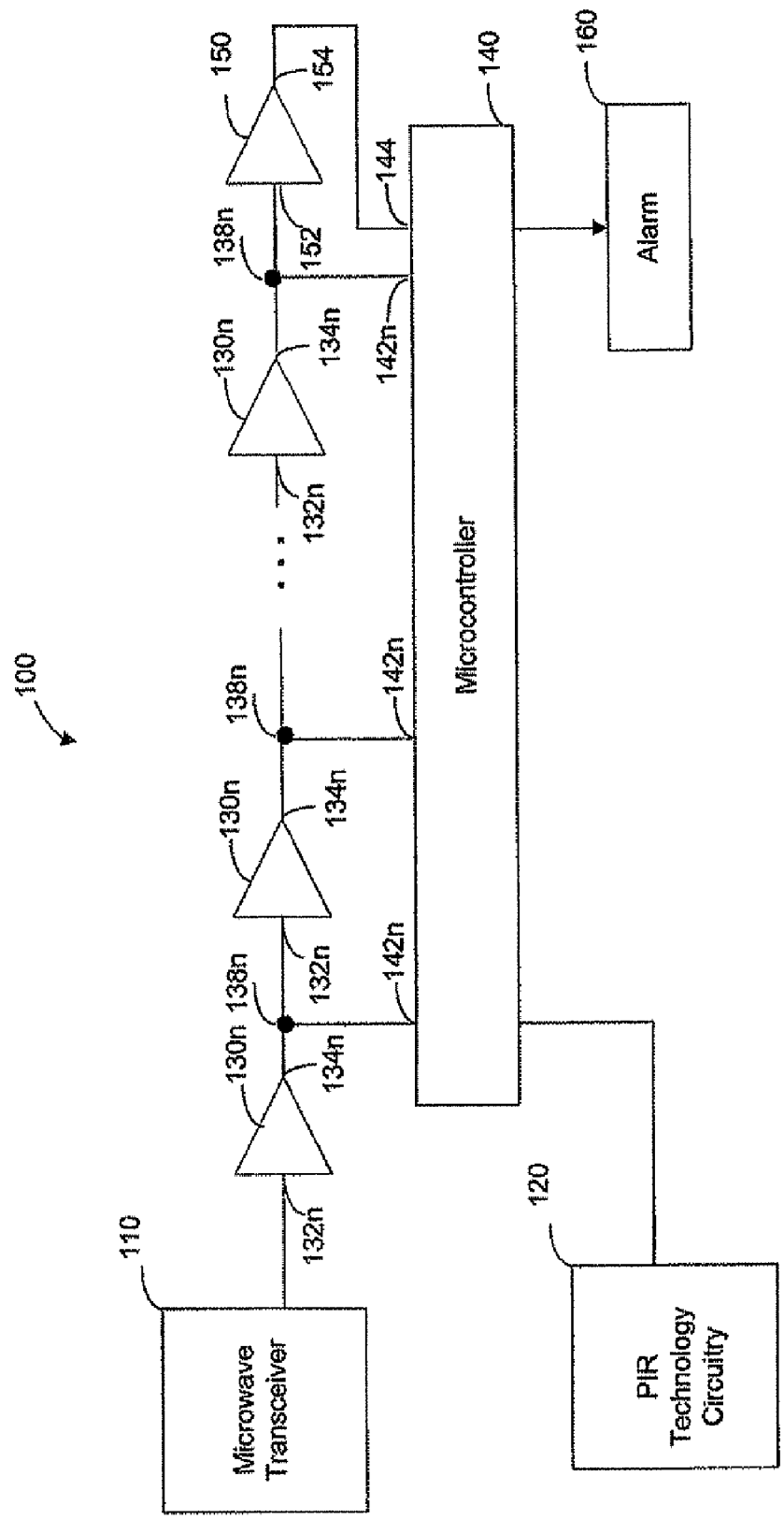

MICROWAVE DIRECTION OF TRAVEL DETECTOR BY PARALLEL SAMPLING

CROSS-REFERENCE TO RELATED APPLICATIONS

The present invention is related to the following commonly-owned, co-pending United States Patent Applications filed on even date herewith, the entire contents and disclosure of each of which are expressly incorporated by reference herein as if fully set forth herein: U.S. patent application Ser. No. 11/862,076, for "DIRECTION OF TRAVEL MOTION SENSOR WITH AUTOMATIC GAIN CONTROL" and U.S. patent application Ser. No. 11/862,078, for "DIRECTION OF TRAVEL MOTION SENSOR."

BACKGROUND OF THE INVENTION

Field of Invention

This invention relates generally to dual technology motion sensors employed in the security industry to detect intruders in a protected area and more particularly, to a method of sensing the direction of travel of an intruder in a protected area.

Dual technology motion sensors for intrusion detection, such as Honeywell's DUAL TEC® Series Sensors include a passive Infrared Radiation sensor (PIR sensor) and a microwave sensor (MW sensor), both of which are employed simultaneously to monitor a protected area for intrusions.

To detect motion, PIR sensors compare an infrared source with one temperature, such as a human passing in front of an infrared source with another temperature, such as a wall. However, PIR sensors do not always detect the presence of an intruder due to elevated room temperatures in the protected area or cloaking by an intruder resulting in situations where PIR may not detect an intruder.

In dual technology sensors, to minimize false alarms the PIR and the microwave technologies compliment each other. A MW sensor employ the Doppler principle where a microwave signal emitted toward a protected area results in a Doppler signal when a moving target is detected. To detect motion, a microwave sensor is monitored for a Doppler signal. For example, if an intruder (target) passes within the protected area, the microwave signals are reflected from the intruder (echo). In other words, the echoed microwave signal is modulated due to the Doppler Effect, where the microwave signal is reflected by the moving target because there is a shift in the reflected signals frequency. This shift is directly proportional to the targets velocity relative to the sensor. Moreover, MW sensors may detect an intruder in the protected area, but without verification from the PIR sensor, no alarm is generated. A short-coming of the dual technology sensor is when one technology detects an intruder but the other technology doesn't then no alarm is generated.

SUMMARY OF THE INVENTION

The present invention provides a dual-mode method of detecting the direction of travel of a target in a protected area using microwave direction of travel sensing and generates an alarm when the PIR fails to detect an intruder.

In one embodiment of the present invention a microwave direction of travel detector is provided comprising, a microwave transceiver for transmitting and receiving a microwave signal directed toward a protected area that outputs a Doppler Signal when a moving target is detected, a chain of amplifiers including two or more amplifiers that are sampled by a controller. The controller samples the output of each of the amplifiers in the chain of amplifiers and compares each output of the amplifiers with previously recorded signal.

In another embodiment of the present invention the output of each amplifier represents a distance from the sensor where a threshold level is set for each amplifier output. Once that level is reached by the signal from the target than the target is at the distance as represented by the amplifier. If the level is reached in one of the other amplifiers in the chain than the target determined to be moving in a direction indicated by the new represented distance and the controller would than send an alarm. If the threshold is not reached by any other amplifier, than it is determined that the target is not moving toward or away from the sensor The controller can be a microcontroller, a FPGA or a DSP chip.

BRIEF DESCRIPTION OF THE DRAWINGS

These and other features, benefits and advantages of the present invention will become apparent by reference to the following text figures, with like reference numbers referring to like structures across the views, wherein:

The FIGURE depicts a dual technology motion sensor for detecting the direction of travel of an intruder by parallel sampling according to one embodiment of the present invention.

DETAILED DESCRIPTION OF THE INVENTION

With reference to the FIGURE, a novel dual technology motion sensor 100 capable of detecting direction of travel of an intruder by parallel sampling an area to be monitored will now be described in accordance with one embodiment of the present invention. The FIGURE depicts a single microwave transceiver 110, a microcontroller 140 and PIR technology circuitry 120. In another embodiment of the present invention, as known to those skilled in the art, the microprocessor can be replaced by an ASIC, FPGA, or a DSP.

As illustrated in the FIGURE, two or more cascading amplifiers 130$n$ are shown receiving a Doppler signal from the microwave transceiver 110 at each input terminal 132$n$ and outputting an amplified Doppler signal at each output terminal 134$n$. According to one embodiment of the present invention, each cascading amplifier 130$n$ will have a higher signal output than the preceding amplifier. Moreover, as will become obvious, the dual technology motion sensor 100 can consist of any feasible number of cascading amplifiers 130$n$ without departing from the scope of the invention. A final amplifier 150 is provided which receives an amplified Doppler signal at input terminal 152 from the output terminal 134$n$ of the final stage of the cascading amplifiers 130$n$ and then outputs an amplified Doppler signal at output terminal 154.

Microprocessor 140 includes a plurality of ports 142$n$ for monitoring the Doppler signal in-between each stage of the amplifiers 130$n$. Each port 142$n$ is coupled to each node 138$n$ disposed in-between each successive cascading amplifier 130$n$. Port 144 is provided for monitoring the output of the fail amplifier 150 to determine if there is a Doppler signal of sufficient strength to indicate a moving target. Alarm 160 coupled to microcontroller 140 is provided to indicate an intruder has entered into a protected region.

The operation of the novel dual technology motion sensor 100 capable of detecting direction of travel of an intruder by parallel sampling an area to be monitored will now be described in accordance with one embodiment of the present invention.

In normal operation, microprocessor 140 monitors each successive stage of the cascading amplifiers 130n, where each amplifier's output represents a different target zone. As indicated above, each cascading amplifier 130n has gain, which would provide a signal representing a certain distance for a human target. For instance, in an embodiment comprising three stages, the first stage of the amplifiers 130n has a gain setting representing a distance of 0 to ⅓ the distance protected (Zone 1), the second amplifier would add more gain to provide a signal for the next ⅓ of the distance (Zone 2) and the last amplifier would provide enough signal for a target that is furthermost from the sensor (Zone 3).

The microcontroller 140 stores the signal levels of each amplifier for comparison over a preset time period as known to those skilled in the art. The microcontroller 140, can determine if an intruder is changing zones which would represent a target (intruder) moving toward or away from the sensor. If the signal is not moving from one zone to the next, it would be assumed to be a target that is maintain a constant distance with respect to the distance from the sensor.

The present invention, as described above provides a novel motion sensor or a microwave sensor capable of detecting direction of travel of an intruder by parallel sampling a cascading an amplified Doppler signal at different gain levels of an area to be monitored. By providing cascading amplifiers coupled to a microcontroller where each stage is connected to the microcontroller, the present invention can calculate the direction of travel and determine if an intruder is not being detected by the other technology thereby generating an alarm which a standard dual technology sensor would not produce.

As will be readily apparent to those skilled in the art, the present invention or aspects of the invention can be realized in hardware, or as some combination of hardware and software. A typical combination of hardware and software could be to analyze and carry out the method described herein, with the controller being an ASIC, DSP or FPGA chip. This method could be used in microwave only sensors or dual technology sensors using microwave and some other technology such as PIR or ultrasonic.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A microwave detector capable of detecting whether an intruder is moving toward or away from a protected area, comprising:
    a microwave transceiver for transmitting and receiving a microwave signal directed toward a protected area producing a Doppler signal when reflected from a moving target;
    a chain of amplifiers having two or more amplifiers coupled to said microwave transceiver for amplifying said received Doppler signal, each amplifier including a gain representing a distance from the microwave transceiver such that each successive amplifier in said chain of amplifiers includes a successively higher gain, and a signal output of each amplifier represents a different distance from the microwave transceiver; and
    a controller for sampling an output of each amplifier of said chain of amplifiers, said controller including a memory for storing said output of each amplifier, and said controller determining whether said intruder is moving toward or away from the protected area based upon sampling a change in said output of each amplifier.

2. The microwave detector of claim 1, wherein each amplifier of said chain of amplifiers is connected in series and each amplifier of said chain of amplifiers has a signal output and each successive amplifier of the chain of amplifiers producing a successively higher signal output.

3. The microwave detector of claim 1, wherein the controller is a microcontroller, a FPGA, an ASIC or a DSP chips.

4. The microwave detector of claim 3, wherein said chain of amplifiers are serially connected and the output from each successive stage of the chain of amplifiers is a successively higher signal output.

5. The microwave detector of claim 1, wherein said microwave direction of travel detector operates in two modes;
    a first mode, wherein an alarm is triggered if both a PRI sensor and a microwave sensor detect motion; and
    a second mode, wherein an alarm is triggered if said microwave sensor detects motion and a direction of travel of said target.

6. The microwave detector of claim 5, wherein the microwave sensor can identify said intruder in different zones.

* * * * *